April 16, 1935.  L. L. HOUCHIN  1,998,395

METHOD AND APPARATUS FOR PRODUCING LENS GRINDING LAPS

Filed April 21, 1933  2 Sheets-Sheet 1

INVENTOR.
Lowell L. Houchin.

BY
Corbett & Mahoney
ATTORNEYS.

April 16, 1935.                L. L. HOUCHIN                1,998,395
              METHOD AND APPARATUS FOR PRODUCING LENS GRINDING LAPS
                        Filed April 21, 1933        2 Sheets-Sheet 2
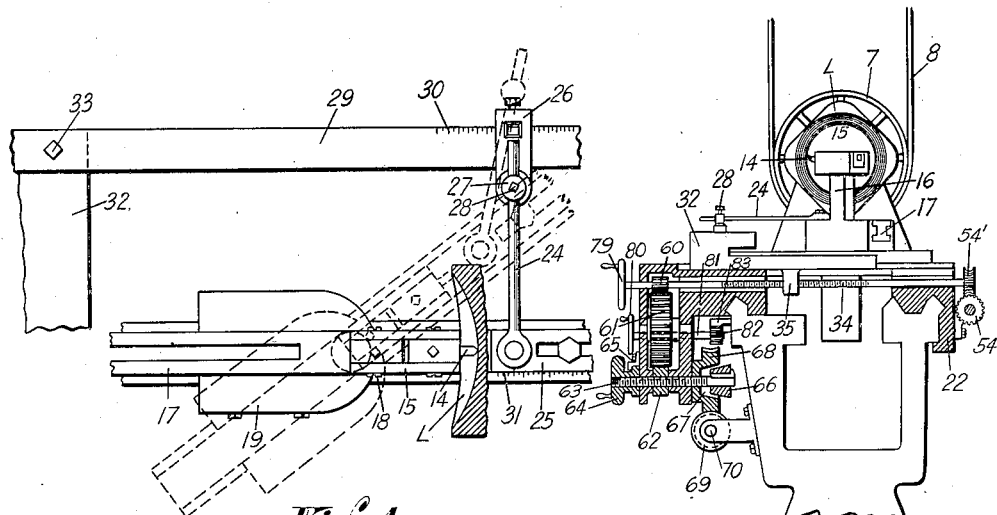
Fig. 4
Fig. 6
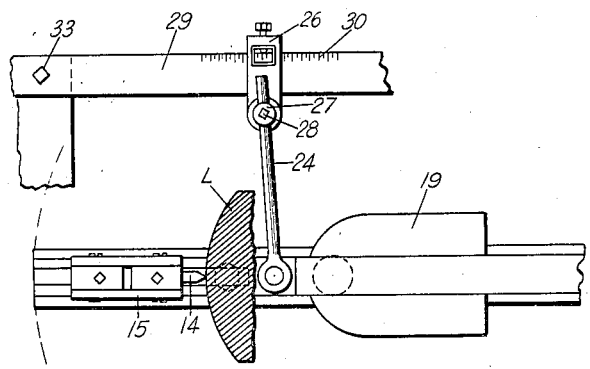
Fig. 5
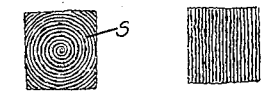
Fig. 8
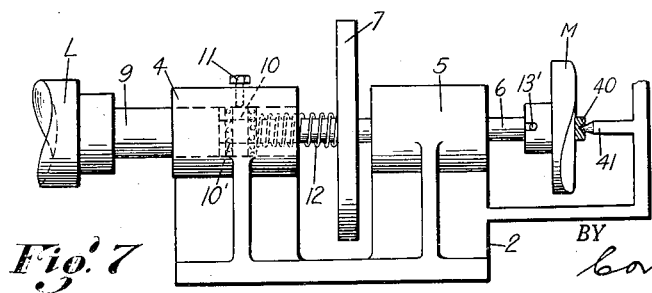
Fig. 7
INVENTOR.
Lowell L. Houchin.
BY
ATTORNEYS.

Patented Apr. 16, 1935

1,998,395

UNITED STATES PATENT OFFICE 1,998,395

METHOD AND APPARATUS FOR PRODUCING LENS GRINDING LAPS

Lowell L. Houchin, Columbus, Ohio, assignor to The Robinson Houchin Optical Company, Columbus, Ohio, a corporation of Ohio Application April 21, 1933, Serial No. 667,248

35 Claims. (Cl. 82—12)

My invention relates to method and apparatus for producing lens grinding laps. It has to do, more particularly, with the production of laps for grinding toric and plano-cylinder lenses, although it is capable of ready adjustment for producing laps for grinding spherical lenses. It is likewise capable of application to the cutting of other types of laps.

In the prior art, it has been customary to make lens grinding laps for toric and plano-cylinder lenses by the use of a cutting tool mounted to travel in an arcuate path and by so mounting the lens grinding lap to be cut that it will move transversely of the path of movement of the cutting tool during the return of the tool to position it for each new cut. Moreover, since the cutting tool only cuts when moving in one direction, in this type of machine, the period during its return from its position at the end of the cut to its position for the initiation of a new cut is a period of inactivity which greatly slows up the speed of the machine and markedly limits the number of laps which may be cut in any given period. In other words, the operation is an intermittent one which is consequently comparatively slow and costly.

Furthermore, in this type of apparatus, the cutting tool must be caused to move in a carefully selected arc to produce a curvature of one radius upon the lap while the lap must be caused to move in a carefully selected different arc to produce a curvature of a desired radius which is different from the radius of the first curvature. This necessity for careful setting of the apparatus further decreases the speed of production of laps upon an apparatus of this type and consequently increases the cost of production.

Some attempts have been made to produce lens grinding laps of the type indicated by the use of master blanks which correspond exactly in surface contour to the lens grinding laps to be formed. However, the drawbacks involved in such a method have rendered it impracticable and have prevented the adoption thereof. For example, the making of a master blank having a surface curvature identical with each lens grinding lap to be produced would result in such a large number of master blanks as to increase the cost of production of laps far beyond practicable limits. With each slight difference of curvature in each meridian of the lap demanding a corresponding difference in each meridian of the master blank, it is obvious that the plan is not feasible. Furthermore, the difficulty of maintaining a point contact on the blank corresponding accurately with the point contact of the tool is another insurmountable difficulty to the adoption of such a method.

One of the objects of my invention is to provide a method for producing lens grinding laps for toric or plano-cylinder lenses which is simple and which can be easily performed in an effective and inexpensive manner.

Another object of my invention is to provide a method and apparatus for producing lens grinding laps of the type indicated by the use of a minimum number of master blanks which will, nevertheless, be adequate to produce laps of all desired curvatures.

Another object of my invention is to provide an apparatus for use in producing lens grinding laps of the type indicated which may be readily adjusted for various purposes, with the required adjustment being reduced to a minimum.

In its preferred form, my invention contemplates the making of lens grinding laps for toric and plano-cylinder lenses by mounting the unfinished lap upon a rotating spindle and by applying thereto a cutting tool which starts to cut adjacent the outer edge of the rotating lap and which moves as it cuts towards the axial center of the lap in a spiral path. The cutting movement of the tool is continuous. Moreover, the cutting tool, while moving towards the axis of the lap, is swinging in an arcuate path which is so selected that it would, but for other apparatus, cut a curved surface entirely across the lap having a radius of curvature corresponding to the radius of curvature in one of the two meridians of the lap grinding surface which is to be produced.

However, my invention further contemplates the provision of a means for automatically advancing the lap against the cutting tool with gradually increasing pressures at selected periods during each complete rotation of the lap and for permitting the automatic recession of the lap progressively and gradually after each automatic advancement, while at the same time gradually diminishing the extent of these intermittent advancements until they diminish to zero as the cutting tool reaches the axial center of the lens grinding lap. The result is that the grinding surface of the lap is modified to produce a power cylinder curve at right angles to the base curve produced by the movement of the cutting tool in its arcuate path, though the two curves merge with each other.

The automatic advance and retraction of the lap in each rotative cycle thereof is under the control of a master blank carried upon the opposite end of the spindle which carries the lap. This master blank has a surface which is plane in one meridian and cylindrical in another and is designed to cooperate with a pressure finger which rides thereon as the blank rotates with the spindle and which moves towards the axial center of the master blank as the cutting tool moves towards the axial center of the lap. The spindle, under the influence of a spring, tends to move to retract the lap from contact with the cutting tool and this movement is resisted by the pressure finger exerting pressure against the curved surface of the master blank. When the pressure finger is traveling upon the raised portion of the curved surface of the master blank, the lap is pressed more strongly against the cutting tool to produce the power cylinder curve on the lap. When this pressure finger is traveling upon the depressed portions of the curved surface of the master blank, the lap is merely pressed against the cutting tool sufficiently to insure the formation of the base curve upon the lap.

The cutting tool and the pressure finger are moved simultaneously across the face of the lap and the face of the master blank, respectively, and in parallel planes by automatic feeding mechanism provided for this purpose. The result is that the raised portions of the master blank become lower portions in the lap while the lower portions in the master blank become relatively raised portions in the lap, the lower portions in the lap forming the power cylinder curve and the raised portions in the lap forming the base curve.

It should be noted, however, that, though the cutting tool and pressure finger should start to move at the same time and should reach the center of the axial lap and master blank simultaneously, they need not start at the same relative positions thereon and need not travel at the same rate of speed. Thus, it will be found that I may vary the speed of the cutting tool across the lap with relation to the speed of the pressure finger across the blank while, at the same time, varying the starting position of the pressure finger on such blanks and, by this means, produce various power cylinder curvatures on lens grinding laps while using the same master blank.

The apparatus which I preferably use in the performance of my method is shown in the accompanying drawings wherein similar characters of reference designate corresponding parts and wherein:

Figure 4 is a view showing the cutting tool in two different positions during the cutting of a concave surface on a lens grinding lap.

Figure 5 is a view similar to Figure 4 showing how the tool is adjusted for the cutting of a convex surface on a lens grinding lap.

Figure 6 is an end view, partly cut away, of the structure shown in Figure 1.

Figure 7 is an enlarged view of the member for carrying the lens grinding lap and the master blank.

Figure 8 is a magnified plan view of portions of a lap made by my method and of a lap made by the usual prior art method, the prior art lap being shown at the right.

Figure 1:
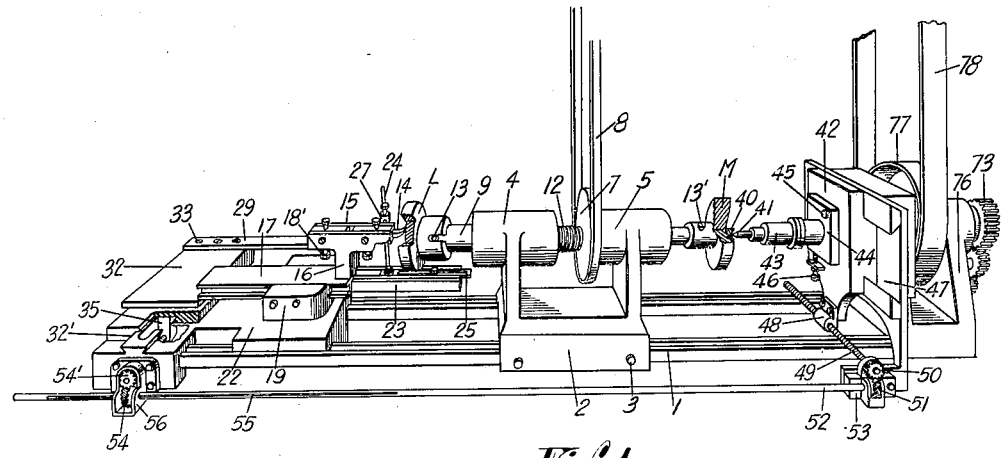
Figure 1 is a perspective view of a machine which I may use in the performance of my method for producing lens grinding laps.
Figure 2:
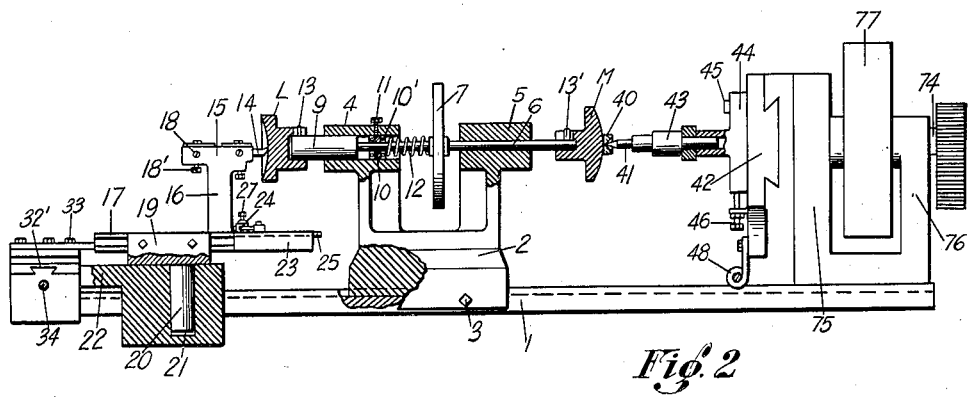
Figure 2 is a side elevation, partly in section, of the machine shown in Figure 1.
Figure 3:
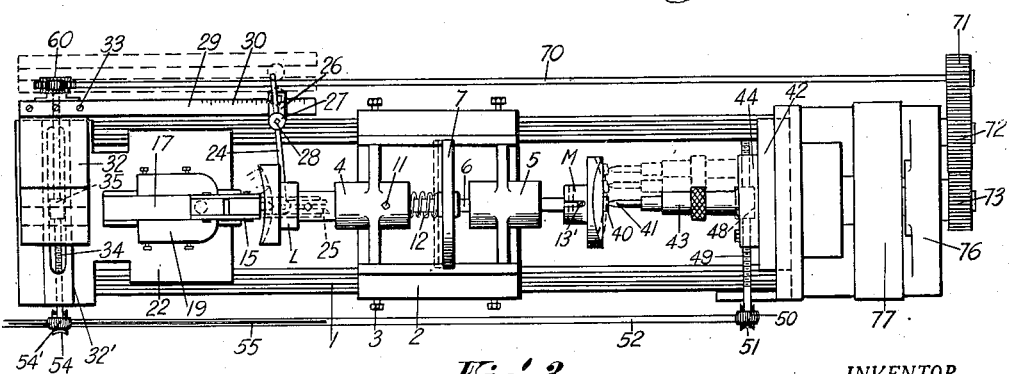
Figure 3 is a top plan view of the structure shown in Figure 1.

In the drawings, the apparatus which I preferably utilize is shown as comprising a bed 1. Adjustably mounted upon the bed 1 is a double standard 2 which may be locked in any adjusted position by means of bolts 3. This double standard is provided with spaced bearing members 4 and 5 which, as shown best in Figure 2, are designed to slidably and rotatably support a spindle 6 which is designed to carry a lap to be ground at one end and a master blank, which assists in regulating the grinding action, at the other end.

The spindle 6 preferably has a pulley 7 keyed thereon and a belt 8 is provided for rotating this pulley. One end of the spindle 6 is enlarged as at 9 and is adapted to receive a lap L. Adjacent the inner end of this enlargement, the spindle is embraced by a collar 10 which is held immovable in the bearing 4 by means of a set screw 11. The spindle, however, is slidably mounted in this collar. Disposed in between the collar 10 and the pulley 7 is a coil spring 12 which yieldably resists movement of the spindle towards the left as shown in Figure 2. Anti-friction bearings 10' are provided at each side of the collar 10 in order to decrease the friction between the end of the spring 12 and the collar, and between the enlarged end 9 of the spindle and the collar when it comes into contact therewith.

The lap L, when positioned upon the enlarged end 9 of the spindle is held against rotation thereon by means of the radial key 13. Furthermore, this lap is held in such position that the surface thereof which is to be cut is, during the operation of the machine, maintained in contact with a tool 14 carried in a tool-holder 15. The tool-holder 15 comprises a standard 16 which is integrally formed upon a slide 17. The tool 14 may be longitudinally adjusted in the holder 15 by means of set screws 18, and may be vertically adjusted by means of set screws 18'. As will be readily seen, the tool-holder 15 is of such a construction that a tool may be inserted in either end thereof.

The slide 17 is slidably adjustable in a guide member 19 which is provided with a downwardly depending pin 20. This pin 20 pivotally supports the guide member in a socket 21 of a plate 22. The plate 22 is adjustable longitudinally of the machine so that the cutting tool may be properly positioned relative to the lap to be cut as will be later seen. This plate 22 is adjustable along the machine to any desired position by a mechanism to be hereafter described.

The tool which is thus pivotally mounted is designed to initiate the cutting action at the outer edge of the surface to be cut. Then, as the lap is rotated with the spindle upon which it is mounted, the cutting tool is designed to be slowly fed across the surface of this lap until the axis of the surface and spindle is reached. However, the tool may initiate the cutting action at the center of the surface to be cut and may be caused to move from the center of such surface to the outer edge thereof.

The means for effecting this gradual swinging of the tool across the face of the lap being cut comprises an extension 23 which projects from one end of the slide 17. It further comprises, as illustrated best in Figures 4, 5 and 6, a transverse link 24 which is connected to the extension 23 by means of a slidably adjustable member 25 and which is connected at its opposite end to a slidably adjustable member 26 by means of a swivel connection 27. The link 24 is likewise slidably adjustable in the swivel connection 27 by means of a set screw 28. The member 26 is adjustable along a bar 29 and this adjustment is facilitated by calibrations 30. Calibrations 31, (Figure 4), are also provided to assist in regulating the adjusted position of the member 26.

The bar 29 is gradually moved transversely of the bed of the apparatus by adjustment of the slide 32 to which it is attached as at 33. The slide 32 is adjustably mounted on a guide member 32' which is formed as a part of the plate 22. The adjustment of this slide is effected by means of a threaded shaft 34 extending through threaded apertured lugs 35 which depend downwardly from the slide 32, into a depression formed in the plate 22.

While the lap which is being cut is being rotated with its surface in contact with the slowly swinging cutting tool, it is held in contact therewith through the medium of the master blank M, a small block 40 and a finger 41. This master blank M is mounted on the end of spindle 6 opposite to that upon which the lap L is mounted, rotation of the master blank M on the end of the spindle being precluded by a radial key 13'.

The block 40 cooperates with the master blank to maintain this contact but the contour of the surface of the master blank with which this block 40 cooperates is such that the spindle which carries the blank and the lap is permitted to recede and advance twice during each rotation of this spindle. In other words, during each rotation of the spindle, the surface of the lap which is being cut by contact with the cutting tool is permitted to recede and advance twice during each rotation of the lap without entirely moving out of contact with the cutting tool. In this manner, the cutting tool will cut two distinct contours upon the lap with their axes angularly disposed with relation to each other, since the block 40 and the finger 41 are caused to slowly traverse the master blank in a manner similar to the travel of the cutting tool across the lap.

The travel of the block 40 carried by finger 41 across the master blank is effected by mounting the finger 41 upon a slide 42. This slide 42 preferably carries a chuck 43 for the retention of the finger 41, the chuck being provided with an enlarged base 44 which is so pivoted to the slide 42 by means of the bolt 45 that it may be readily swung to various positions of adjustment by means of the adjusting bolt 46. The slide 42 is carried in a slideway 47.

The slide 32 and the slide 42 are designed to be gradually fed transversely of the bed of the machine so that the tool 14 and the block 40 carried by finger 41, respectively, will be gradually fed from the outer edge of the lap to be cut and from a selected point on the master blank towards the axial center thereof. However, as previously stated, the tool may be gradually fed from the center of the lap to be cut towards the outer edge thereof and the block 40 may be gradually moved from the center of the master blank towards the outer edge thereof. This feeding action is simultaneous. Thus, the slide 42, carries, at its lower end, an internally threaded sleeve 48 which receives a feed screw 49. The outer end of the feed screw carries a spiral gear 50 which meshes with another spiral gear 51 upon the one end of the shaft 52 which is supported upon the bed of the machine at one end by means of a bracket 53. The shaft 52 extends longitudinally of the machine and has a spiral gear 54 splined thereon at its opposite end, by means of the elongated key-way 55 and a key (not shown) carried on the inner portion of the gear. This shaft is supported in the bracket 56 which is carried upon the outer edge of the plate 22. Meshing with the spiral gear 54 is another spiral gear 54' which is carried upon one end of the feed screw 34.

The feed screw 34 extends entirely across the bed of the machine and at its opposite end carries a gear 60 which, as shown in Figure 6, meshes with a larger gear 61. This gear 61 in turn meshes with a pinion 62 which is splined upon the threaded shaft 63 that is mounted for longitudinal movement therethrough. This threaded shaft 63 has its outer end threaded into a hand wheel 64 which is rotatably mounted upon the side of the bed of the machine by means of a cap 65 and which may be rotated to feed the shaft 63 along its own axis. The inner end of the shaft 63 carries a friction clutch member 66 which is movable into and out of a frusto-conical socket 67 in the face of a worm gear 68. Thus, the hand wheel 64 may be adjusted to either clutch the worm gear 68 to the threaded shaft 63 for rotation with the pinion 62 or it may be entirely released therefrom.

The worm gear 68 meshes with the worm 69 splined upon the shaft 70 which extends longitudinally of the bed of the machine and which carries at its opposite end a gear 71. The gear 71 is adapted to be driven for rotating the shaft 70 by means of a gear 72 which in turn meshes with a gear 73 upon the shaft 74. This shaft 74 is journaled between the upstanding supports 75 and 76 and carries a pulley 77 which is driven by a belt 78 for imparting rotation to the shaft. The hand wheel 80 operates through a shaft 81, pinion 82 and rack 83 on the member 22 to move the member 22 along the bed of the machine for presentation of the tool to the work or for removal therefrom.

By operating the hand wheel 64, the plate 32 may be adjusted to any desired position transversely of the bed of the machine, inasmuch as the clutch member 66 is in clutching relation to the worm gear 68 and the plates 32 and 42 are movable transversely by the shaft and gearing associated therewith. It will also be noted that the feed screw 34 is provided with a hand wheel 79 which permits of its manual rotation. This hand wheel 79 is particularly advantageous for the placing of the apparatus in position for initiating the cutting action or for initiating a re-cutting action, the clutch member 66 being rendered inoperative during this manual operation.

In operation, the lap to be cut is mounted upon the enlarged end 9 of the spindle and the selected master blank is mounted upon the opposite end thereof. The slide 17 is adjusted in the guide member 19 to such a position that the cutting tool will swing through that arc that will result in the formation on the grinding surface of the lap of a base curve of a selected radius.

The linkage mechanism for connecting the arm 20 to the extension 23 of the slide 17 is properly adjusted so that, upon movement of the slide 32 transversely of the machine, the cutting tool will be swung in its arc at the desired rate of speed. It will be understood that by moving the member 26, which is used for connecting the link 24 to the member 23, closer to the pivot point 21 of the tool carrying member, movement of the slide 32 will cause a more rapid swinging movement of the cutting tool through its arc of movement. If the member 25 is moved away from the pivot point 21, the speed of this swinging movement of the cutting tool will be decreased.

The plate 22 is then moved along the bed of the machine until the tool is properly presented to the lap, this being accomplished by manipulating the hand wheel 30. Then, the cutting tool support is moved to position the cutting tool at the outer edge of the lap surface to be cut, providing this cutting operation is to begin at the outer edge and progress inwardly. At the same time, the supporting means for the block 40 of the pressure finger mechanism is adjusted to position this block 40 at any desired distance from the axial center of the master blank. Then, the hand wheel 64 is rotated to clutch the worm gear 66 to the threaded shaft 63, thus placing the cross feeding apparatus of the machine in operative condition.

With the machine set in motion, power is applied to the pulley 7 by the belt 8 and to the pulley 77 by the belt 78. The rotation of the pulley 7 effects rotation of the spindle with the lap and the master blank thereon. Rotation of the pulley 77 by the belt 78 results in rotation of the shaft 79 and consequent rotation of the shaft 52 which drives the feed screws 34 and 49 to feed the slides 32 and 42 transversely of the bed of the machine.

Movement of the slide 32 results in gradual swinging of the tool support 19 so that the tool 14 cuts the surface of the lap and gradually moves towards the axial center of such lap. The movement is sufficiently gradual to insure the production of a spiral path of cut with the convolutions of the spiral closely related and with each convolution of substantially circular form with the axis of the lap forming the approximate center of each convolution. The surface produced upon the lap shows a spiral rib completely covering this surface, as illustrated by the magnified showing at S in Figure 8.

It will be understood that the movement of the cutting tool in a previously selected arcuate path across the face of the rotating lap and in contact therewith results in the production of one of the curves of the lap face, preferably, the base curve thereof. Thus, by the adjustment of the arc of movement of the cutting tool, a base curve of any selected radius may be produced upon the face of the lap.

Simultaneously with the gradual swinging movement of the cutting tool across the face of the lap, the block 40 is caused to travel across the face of the master blank in contact therewith by the travel of the slide 42 under the control of the feed screw 49. Though the increments of movement of the cutting tool 14 and the block 40 are not always identical, they leave the edge of the lap and the preselected point on the master blank, respectively, at the same time and reach the axial center of the lap and the blank simultaneously.

The surface of the master blank upon which the block 40 rides is of plano-cylindrical form. It does not attempt to reproduce the power cylinder curve in its entirety. It merely serves, by moving the spindle along its own axis to apply additional pressure of the lap against the cutting tool at selected periods during each rotation of the lap to vary the depth of cutting of the cutting tool in exact proportion to the differences between the base curve selected and being produced by the cutting tool on the lap and the power cylinder curve which is to be formed on the face of the lap at right angles to the base curve.

The result is that, where the face of the lap is to be concave, the curved meridian of the master blank is convex. Then, when the block 40 rides upon the raised portion of this plano-cylindrical surface of the master blank, the lap is forced with greater pressure against the cutting tool and this results in creating a plurality of cylindrical concavities at right angles to the base curve of the lap and of such a radius that they complete the desired power cylinder curve.

An important aspect of this invention arises from the fact that no attempt is made to provide a master blank whose bearing surface is the complete reverse of the surface of be formed upon the lap. As a matter of fact, no attempt is made to provide the master blank with a bearing surface comprising the complete reverse of the power cylinder curve which is formed on the lap, except where plano-cylindrical lap surfaces are to be produced. Where toric lap surfaces are to be produced, the curve upon the master blank merely represents the difference between the base curve to be formed on the lap and the power cylinder curve to be formed thereon.

For example, if, in forming a concave lap surface, the base curve upon such surface is to have a radius of 6 dioptres and the power cylinder curve is to have a radius of 8 dioptres, the bearing surface of the master blank takes the form of a convex cylinder with a 2 dioptre radius and, being a plano-cylindrical surface, it is flat along one meridian. Then, when the block 40 travels around the bearing surface of the master blank in a spiral path, it rides up and down the wall of the cylinder, first on one side and then on the other so as to advance the lap against the cutting tool and permit the retraction thereof twice in each complete rotation of such lap. These advances which occur twice in each rotation of the lap are sufficient to increase the depth of the curve being cut by the tool at two areas on the lap surface to the extent of 2 dioptres, with the result that the power cylinder curve of 8 dioptres is produced at right angles to the base curve of 6 dioptres resulting from the arcuate movement of the cutting tool.

However, when a lap having a plano-cylindrical grinding surface is to be produced, the bearing surface of the master blank takes the form of a cylinder which is the reverse of the power cylinder to be formed on the grinding surface of the lap but which has the same radius of curvature. In this case, the cutting tool will not be swung in an arc but will move in a straight line across the surface of the lap as it cuts and, if the power cylinder is to be 8 dioptres, the difference between the plane surface and the power cylinder will be the full 8 dioptres. Consequently, the cylinder formed on the bearing surface of the master blank will have a radius of curvature of 8 dioptres.

Since no attempt is made to provide a master blank having a bearing surface portion which is the complete reverse of the power cylinder curve and since the curved portion of the bearing surface of this master blank is merely designed to reproduce the differences between the base curve and the power cylinder curve, one set of master blanks will be suitable for any selected base curve. The importance of these features of my invention will be obvious. The provision of a separate master blank for each lap, as attempted in the prior art, considering the great number of base curves and power cylinder curves required, would render the idea of providing a master blank for each lap impracticable, because of the expense alone. But the provision of a single series of master blanks applicable to any selected base curve and merely manipulating the lap to produce the differences between the base curve and the power cylinder curve is a highly practicable method.

It will further be understood that a single master blank may be used for producing various grinding laps by varying the starting point of movement of the block 40 across the face of this master blank and, at the same time, by adjusting the member 25 towards or from the pivot point 21 of the tool carrying member. For example, by starting the block 40 at a point closer to the center of the master blank bearing surface, the extent of reciprocation of the spindle and lap may be decreased and by moving the member 25 closer to the pivot point of the tool, the speed of movement of the tool may be increased to insure that the tool will reach the center of the lap at the same time that the block 40 reaches the center of the master blank, though it has a greater distance to travel. Obviously, these adjustments may be used to alter the curvature differences between the base curve and the power cylinder curve, while still using the same master blank.

As previously stated, the lens grinding lap may be produced by initiating the cutting action at the center of the lap to be cut and causing the tool to gradually feed across the surface thereof and until it reaches the outer edge thereof. If the operation is to be performed in this manner, the cutting tool support is swung to position the cutting tool at the center of the lap to be cut. At the same time, the finger 41 and its supporting slide 42 are adjusted to position the block 40 at the center of the master blank. Then the slides 32 and 42 are caused to move transversely of the machine. Movement of slide 32 results in gradual swinging of tool support 19 and tool 14 away from the axial center of the rotating lap and in contact therewith, cutting the desired surface thereon. Simultaneously, with this swinging movement the block 40 is caused to travel across the face of the master blank and move away from the center thereof. As previously stated, the speed of the swinging movement of the tool relative to the speed of movement of the block 40 across the master blank may be varied by changing the adjustment of the linkage mechanism which connects the bar 29 to the member 23. Thus, the position which the block 40, moving across the face of the master blank, will have reached when the tool reaches the edge of the lap being cut, may be varied and consequently the curvature of the surface produced on the lap may be varied in this manner.

In some instances it may be desirable to have the cutting tool travel across the surface of the lap to be cut from the axial center to the outer edge thereof and then travel back from the outer edge thereof to the axial center again in contact with the lap. In this manner a lens grinding blank of very high quality may be produced.

It will be understood that though this description deals with a production of concavities upon the lap surface, it may also deal with the production of convexities thereon. Where a convex grinding surface is to be produced on the lap, a master blank having a bearing surface of concave form should be used. In this case, it is merely necessary to remove the slide 17 from its support 19 and to place it therein again in a reverse position. When this is done a tool 14 must be placed in the other end of the tool-holder 15. The tool support 17 may be adjusted in the support 19 so as to bring the tool in the rear of the axis of the pivot 20 (Figure 5) and the plate 22 and associated parts may be properly adjusted to maintain the cutting tool in proper cutting relation to the lap. In this adjusted position the link 24 will be connected to the extension 23 of the slide 17 at a point in rear of the pivot 20, and will cause the tool to be swung in such a manner as to produce a convex grinding surface on the lap.

It will be apparent that my machine is readily applicable for use in producing lens grinding laps adapted to be used in grinding spherical lenses. When the machine is used for grinding lenses of this type it will not be necessary to use the master blank. It will merely be necessary to cause the tool 14 to swing across the face of the rotating lap to be cut, thereby causing a spherical curve to be cut thereon.

It will be seen from the above description that I have provided a method and apparatus for producing lens grinding blanks having many important and advantageous characteristics. For one thing, the method which I utilize permits the cutting of a lap for grinding lens blanks of toric and plano-cylindrical form by a continuous cutting operation. In other words, after the cutting tool starts to cut the grinding surface of the lap, it continues this cutting operation until this grinding surface is completely formed. This greatly shortens the time required for forming grinding surfaces of the type indicated and thereby greatly decreases the cost of production of laps for producing toric or plano-cylindrical lenses. In addition, the machine which I utilize is readily convertible for use in the production of lens grinding laps having spherical grinding surfaces.

Another advantageous aspect of my invention arises from the fact that I have dispensed with the necessity for moving both the cutting tool and the lap in carefully selected arcs. This does away with the necessity for careful adjustment which inevitably adds to the cost of production of laps of the type indicated.

Still another advantage of my apparatus arises from the fact that I am able to use master blanks for the formation of toric and plano-cylindrical laps with curvatures thereon that relate merely to one of the curves to be formed on the grinding surface of the lap, preferably the power cylinder curve thereof. This has marked advantages in the formation of plano-cylindrical laps but it is even more advantageous in the making of toric laps, inasmuch as a comparatively small number of master blanks may be used and will be applicable to any base curve.

A still further advantage of my invention arises from the fact that it renders possible the use of a single master blank for the making of different power cylinder curves on the grinding surfaces of laps.

A still further advantage of my invention arises from the fact that my apparatus may be readily used for the formation of lens granding laps having either convex or concave grinding surfaces. Moreover, the adjustments to be made for the accomplishing of these different operations are extremely simple.

Various other advantages of this invention will appear from the preceding description and from the appended claims.

Having thus described my invention, what I claim is:

1. The method of cutting lens grinding laps for grinding toric lenses which comprises effecting relative movements of the lap and a cutting tool in contact therewith to produce a plurality of substantially circular cuts across the face of the lap with the tool swinging in an arc to determine the base curve of the lap, and varying the pressure between said tool and said lap at selected portions of each circular cut to produce a power cylinder curve at right angles to said base curve.

2. The method of cutting lens grinding laps for grinding toric or plano-cylinder lenses which comprises effecting relative rotation of the lap and a cutting tool in contact therewith to produce a plurality of substantially circular cuts across the face of the lap, and varying the pressure between said tool and said lap at selected periods of each rotation by a master blank having a plano-cylindrical surface.

3. The method of cutting lens grinding laps for grinding toric or plano-cylinder lenses which comprises effecting relative rotation of the lap and a cutting tool in contact therewith to produce a plurality of substantially circular cuts across the face of the lap, and reciprocating said lap along its axis to vary the depth of cut of the tool at selected periods of each rotation by a pressure finger applied to a master blank connected to said lap and having a plano-cylindrical surface with which said pressure finger cooperates.

4. The method of cutting lens grinding laps for grinding toric or plano-cylinder lenses which comprises effecting relative rotation of the lap and a cutting tool in contact therewith while moving the cutting tool across the face of the lap to produce one surface on said lap, and varying the pressure between said tool and said lap at selected periods of each rotation to vary the surface of the lap and produce a curved surface thereon at right angles to said first surface.

5. The method of cutting lens grinding laps for grinding plano-cylinder lenses which comprises effecting relative rotation of the lap and a cutting tool in contact therewith while moving the cutting tool in a straight line across the face of the lap to produce one surface on said lap, and varying the pressure between said tool and said lap at selected periods of each rotation to vary the surface of the lap and produce a curved surface thereon at right angles to said first surface.

6. The method of cutting lens grinding laps for grinding toric lenses which comprises effecting relative rotation of the lap and a cutting tool in contact therewith and simultaneously moving the cutting tool across the face of the lap in an arc that will produce the base curve on said lap, and varying the pressure between said tool and said lap at selected periods of each rotation by means of a master blank having a plano-cylindrical controlling surface with the meridian of the curved surface thereof curved on such a radius that it will produce in the lap surface curves additional to said base curve which represent the difference between the radius of curvature of said base curve and the radius of curvature of said power cylinder curve.

7. The method of cutting lens grinding laps for grinding toric lenses which comprises effecting relative rotation of the lap and a cutting tool in contact therewith and simultaneously moving the cutting tool across the face of the lap in an arc that will produce the base curve on said lap, and varying the pressure between said tool and said lap at selected periods of each rotation by any one of a series of master blanks having plano-cylindrical controlling surfaces whose curved meridians represent the difference between the radius of curvature of any base curve selected and the radius of curvature of any selected power cylinder curve.

8. The method of cutting lens grinding laps for grinding toric lenses which comprises effecting relative rotation of the lap and a cutting tool in contact therewith and simultaneously moving the cutting tool across the face of the lap in any one of a series of arcs selected to produce any desired base curve on said lap, and varying the pressure between said tool and said lap at selected periods of each rotation by any one of a series of master blanks having plano-cylindrical controlling surfaces which are so designed that each master blank will produce in the lap being cut the curvature differences between the base curve and the power cylinder curve and that the single series of master blanks is applicable to the completion of power cylinder curves on laps having any base curve formed thereon by any preselected arcuate path of the cutting tool.

9. The method of cutting lens grinding laps for grinding toric lenses which comprises rotating the lap in contact with a cutting tool which is moving in an arc preselected to determine the base curve and manipulating the blank during the cutting operation to introduce variations in curvature from the surface that would be cut by the arcuate movement of said tool across the face of said rotating lap and controlling the manipulations of said blank to produce said variations by a series of master blanks which merely reproduce on the lap the differences between the base curve and the power cylinder curve and which are so designed that the same series of master blanks is applicable to reproduce these differences in connection with any base curve that may be selected.

10. The method of cutting lens grinding laps which comprises relatively moving the lap and cutting tool in contact to effect a plurality of substantially circular cuts and varying the depth of cut at selected periods of each rotation.

11. The method of cutting laps for grinding toric or plano-cylinder lenses which comprises placing a cutting tool in contact with the surface to be cut, effecting relative movement between the lap and tool and maintaining such movement continuously to completely cut the surface by one continuous cutting action, and varying the pressure between the lap and cutting tool at selected intervals.

12. The method of cutting laps for grinding toric or plano-cylinder lenses which comprises placing a cutting tool in contact with the surface to be cut, transcribing a substantially circular cut upon such surface, and varying the pressure between said tool and such surface to vary the depth of cut and to thereby produce areas of selected curvature.

13. A method of cutting lens grinding laps which comprises rotating the lap upon its own axis with the surface thereof to be cut in contact with the cutting tool, gradually moving the cutting tool across the surface to be cut, and effecting relative reciprocation between the cutting tool and the surface to be cut to thereby produce surfaces of selected curvatures.

14. A method of cutting lens grinding laps which comprises rotating the lap upon its own axis with the surface thereof to be cut in contact with the cutting tool, gradually moving the cutting tool in a predetermined arc across the surface to be cut, and effecting relative reciprocation between the cutting tool and the surface to be cut to produce surfaces of different curvatures.

15. A method of cutting lens grinding laps which comprises effecting the rotation of the lap with the surface thereof to be cut in contact with a cutting tool, gradually moving the cutting tool across the surface to be cut, and intermittently effecting relative reciprocation of the cutting tool and the surface to be cut by moving the lap along its axis so as to produce surfaces of different curvatures.

16. A method of cutting lens grinding laps which comprises effecting the rotation of the lap with the surface thereof to be cut in contact with the cutting tool, and intermittently varying the depth of cut of said cutting tool under control of a master blank to produce surface of different curvature on the lap.

17. A method of cutting lens grinding laps which comprises rotating the surface to be cut in contact with a gradually swinging cutting tool, and varying the depth of cut at preselected intervals to produce surfaces of different curvature on said lap.

18. Apparatus for cutting lens grinding laps comprising a means for rotating the lap upon its own axis, a cutting tool adapted to be moved into contact with the surface of the lap to be cut, means for gradually moving the cutting tool across the surface to be cut, and means for effecting relative reciprocation between said cutting tool and the surface to be cut.

19. Apparatus for cutting lens grinding laps comprising a means for rotating the lap upon its own axis, a cutting tool adapted to be moved into contact with the surface of the lap to be cut, means for gradually moving the cutting tool across the surface to be cut in a predetermined arc, and means for intermittently effecting relative reciprocation between said cutting tool and the surface to be cut.

20. Apparatus for cutting lens grinding laps comprising a means for rotating the lap upon its own axis, a cutting tool adapted to be moved into contact with the surface of the lap to be cut, means for gradually moving the cutting tool across the surface to be cut in a predetermined arc, means for intermittently effecting relative reciprocation between the cutting tool and the surface to be cut, and means for varying the arc through which the tool moves.

21. Apparatus for cutting lens grinding laps comprising a means for rotating the lap, a cutting tool mounted adjacent the lap and contacting with the surface of the lap to be cut, means for gradually moving the cutting tool either way across the surface to be cut, and means for intermittently effecting relative reciprocation of the cutting tool and the surface to be cut by moving said lap along its own axis.

22. Apparatus for cutting lens grinding laps comprising a means for rotating the lap about its own axis, a cutting tool mounted adjacent the lap and contacting therewith, and means for intermittently varying the depth of cut of said cutting tool during each rotation of the lap to produce surfaces of different curvature on the lap.

23. Apparatus for cutting lens grinding laps comprising a means for rotating the lap about its own axis, a cutting tool contacting with the surface of the lap to be cut, and means for intermittently varying the depth of cut of said cutting tool during each rotation of the lap, said means comprising a master blank.

24. Apparatus for cutting lens grinding laps comprising a means for rotating the lap, a cutting tool contacting with the surface of the lap to be cut, means for causing relative longitudinal reciprocation of the cutting tool and the surface to be cut under the influence of a master blank, means for moving said cutting tool across the surface to be cut, and means for controlling the relative movements of the cutting tool and the lap in such a manner that a single master blank may be used for producing a plurality of laps having different curvatures on the faces thereof.

25. Apparatus for cutting lens grinding laps comprising a means for rotating the lap, a cutting tool contacting with the surface of the lap to be cut, means for causing relative longitudinal reciprocation of the cutting tool and the surface to be cut under the influence of a master blank, means for moving said cutting tool across the surface to be cut and controlling the relative movements of the tool and the surface to be cut in such a manner that curvatures different than the master blank will be produced on the face of the lap.

26. Apparatus for cutting lens grinding laps comprising a means for rotating the lap, a cutting tool in contact with the surface of the lap to be cut, means for gradually swinging the cutting tool across the surface of the lap to be cut, and means for varying the depth of cut of said cutting tool at preselected intervals, said means comprising a master blank.

27. Apparatus for cutting lens grinding laps comprising a spindle, means for mounting a lap to be cut on one end of said spindle, means for mounting a master blank on the opposite end of said spindle, a cutting tool mounted adjacent the lap to be cut and contacting with the surface thereof, means for gradually moving the cutting tool across the surface to be cut, in a predetermined arc, and means for effecting longitudinal reciprocation of said spindle under the control of said master blank.

28. Apparatus for cutting lens grinding laps comprising a spindle, means for mounting a lap to be cut on one end of said spindle, means for mounting a master blank on the opposite end of said spindle, a cutting tool mounted adjacent the lap to be cut and contacting with the surface thereof, means for gradually moving the cutting tool across the surface to be cut, in a predetermined arc, means for effecting longitudinal reciprocation of said spindle under the control of said master blank, and means for varying the arc of movement of said tool.

29. Apparatus for cutting lens grinding laps comprising a spindle, means for mounting a lap to be cut and a master blank on opposite ends of said spindle, a cutting tool mounted adjacent the lap to be cut and contacting with the surface thereof, a finger mounted adjacent said master blank and contacting with the surface thereof, means for gradually swinging said cutting tool across the face of the lap, in a predetermined arc, means for moving said finger across the face of the master blank, and means for causing longitudinal reciprocation of said spindle under the control of the movement of said finger across the face of said master blank.

30. Apparatus for cutting lens grinding laps comprising a spindle, means for mounting a lap and a master blank on opposite ends of said spindle, a cutting tool mounted adjacent the lap and contacting with the surface of the lap to be cut, means for gradually swinging the cutting tool across the surface to be cut, in a predetermined arc, a finger contacting with the surface of said master blank, means for moving said finger across the face of the master blank, means for causing longitudinal reciprocation of said spindle under the control of the movement of said finger across the face of said master blank, and means for synchronizing the swinging of said cutting tool and the movement of said finger.

31. Apparatus for cutting lens grinding laps comprising a spindle, means for mounting a lap and a master blank on opposite ends of said spindle, a cutting tool mounted and adjacent the lap and contacting with the surface of the lap to be cut, means for gradually swinging the cutting tool across the surface to be cut, in a predetermined arc, a finger contacting with the surface of said master blank, means for moving said finger across the face of the master blank, means for causing longitudinal reciprocation of said spindle under the control of the movement of said finger across the face of said master blank, means for synchronizing the swinging of said cutting tool and the movement of said finger, and means for varying the speed of the swinging movement of said cutting tool relative to the speed of movement of said finger.

32. Apparatus for cutting lens grinding laps comprising a means for rotating the lap, a cutting tool mounted adjacent the lap and contacting therewith, means for swinging said cutting tool along the surface of the lap to be cut in an arcuate path, means for varying the path of said cutting tool, and means for intermittently moving said lap along its axis, said last-named means being under the control of a master blank.

33. Apparatus for cutting lens grinding laps comprising a means for rotating the surface to be cut in contact with a gradually swinging cutting tool, and means for varying the depth of cut at preselected intervals to produce surfaces of different curvatures on said lap, said last-named means being under the control of a master blank.

34. Apparatus for cutting lens grinding laps for grinding toric lenses comprising a rotatable lap supporting means, means for rotating said lap supporting means, a cutting tool, mechanism for moving said cutting tool in an arc across the face of said lap and in contact therewith, means for adjusting said mechanism to vary the radius of the arc of said cutting tool so that the radius of one curve of the face of said lap may be predetermined, means for automatically moving said rotatable lap supporting means towards said cutting tool to variable extents during selected periods in each rotation of said lap, said means comprising a pressure finger riding upon a curved base of a master blank whose curved face is designed to force the lap against the cutting tool at such selected periods merely to the extent necessary to introduce such variations from the base curve of said lap surface as to produce the power cylinder curve on said lap at right angles to the base curve thereof.

35. An apparatus for cutting lens grinding laps for grinding toric or plano-cylinder lenses, the combination of a lap cutting tool, a means for rotating a lap in contact with said tool, a means for moving said tool across the face of a lap carried by said rotating means, and means for automatically varying the pressure of said cutting tool against said lap during each rotation of said lap, said means comprising a series of master blanks designed to vary the tool pressure so as to produce the differences between the base curve of plane surface of the lap and the power cylinder curve thereof.

LOWELL L. HOUCHIN.